(12) United States Patent
Emory

(10) Patent No.: US 7,637,051 B2
(45) Date of Patent: Dec. 29, 2009

(54) ADJUSTABLE TROLLING DEVICE

(76) Inventor: John E. Emory, 2833 Neahtawanta Dr., Traverse City, MI (US) 49686

( * ) Notice: Subject to any disclaimer, the term of this patent is extended or adjusted under 35 U.S.C. 154(b) by 411 days.

(21) Appl. No.: 11/389,371

(22) Filed: Mar. 24, 2006

(65) Prior Publication Data

US 2006/0213113 A1  Sep. 28, 2006

(51) Int. Cl.
*A01K 91/00* (2006.01)
(52) U.S. Cl. ..................... 43/43.13
(58) Field of Classification Search ............. 43/43.13, 43/42.03, 42.22, 42.23, 42.49
See application file for complete search history.

(56) References Cited

U.S. PATENT DOCUMENTS

| 2,622,362 A | * | 12/1952 | Jensen | 43/43.13 |
| 2,726,475 A | * | 12/1955 | Wiselka | 43/43.13 |
| 2,924,907 A | * | 2/1960 | Hamilton | 43/43.13 |
| 2,976,642 A | * | 3/1961 | Wickman et al. | 43/43.13 |
| 3,023,537 A | * | 3/1962 | Madson | 43/43.13 |
| 3,940,872 A | * | 3/1976 | Weber | 43/43.13 |
| 4,254,573 A | * | 3/1981 | Mastropaolo | 43/43.13 |
| 4,461,115 A | * | 7/1984 | Carrillo | 43/43.13 |

* cited by examiner

*Primary Examiner*—Kimberly S Smith
(74) *Attorney, Agent, or Firm*—Douglas S. Bishop

(57) ABSTRACT

An Adjustable Trolling Device, or dodger, consisting of a flat primary body and configured to be removably attached at one or more points along its edge to a primary fishing line, and at other points on its edge, at least some of which may be substantially opposite to the point where it is affixed to the primary fishing line, to trailing fishing bait, or lures. The device has an attached mounting surface, rotatable through 360°, or a specified range, projecting one or more guiding fins, substantially perpendicular to the rotatable mounting surface. The mounting surface, by its nature, may be rotated to place the guiding fins at alternate desired angles from the leading fishing line, so that movement of the dodger through the water may produce a variety of rotation or roll characteristics of the dodger and, correspondingly, the trailing bait or lures.

13 Claims, 5 Drawing Sheets

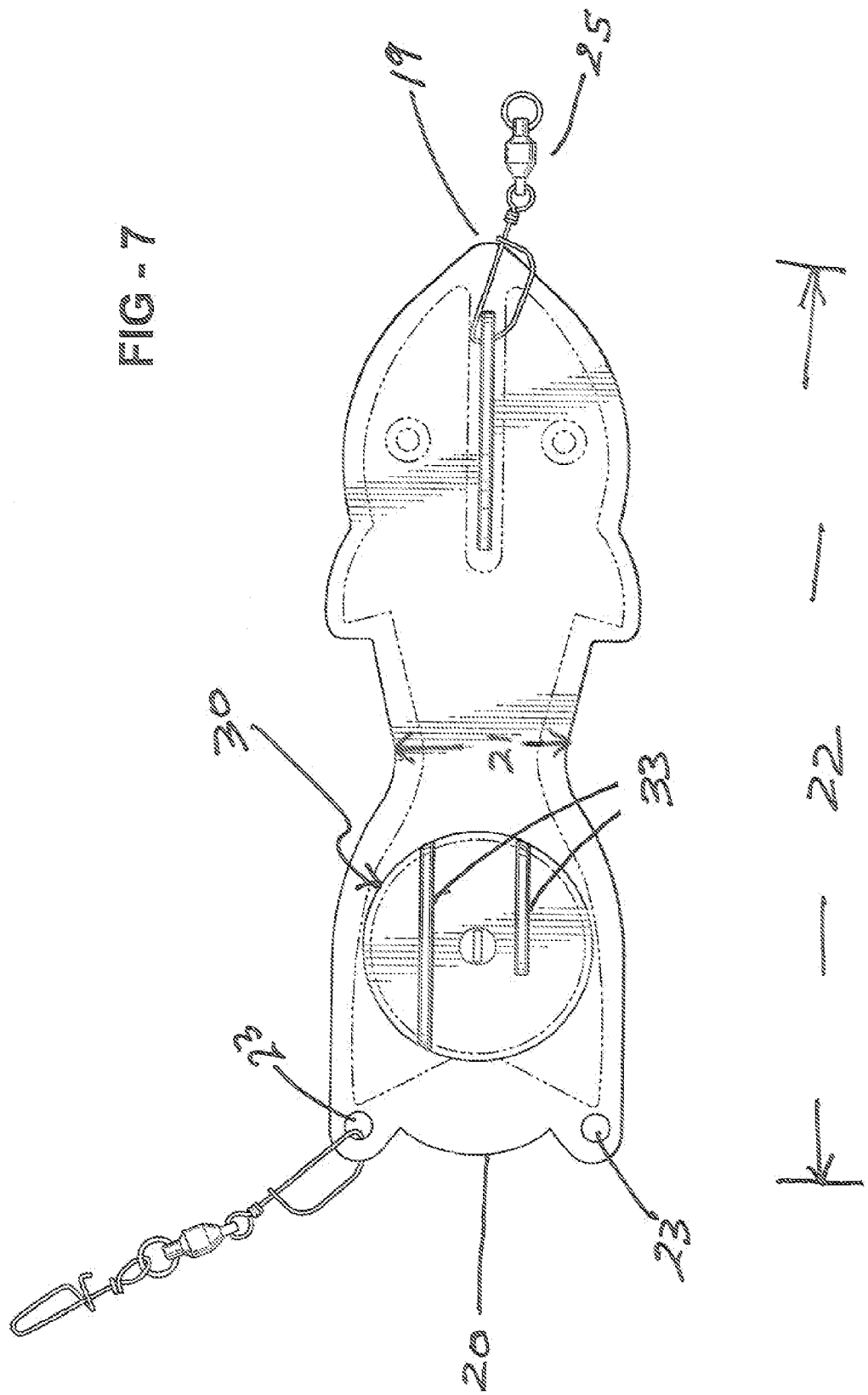

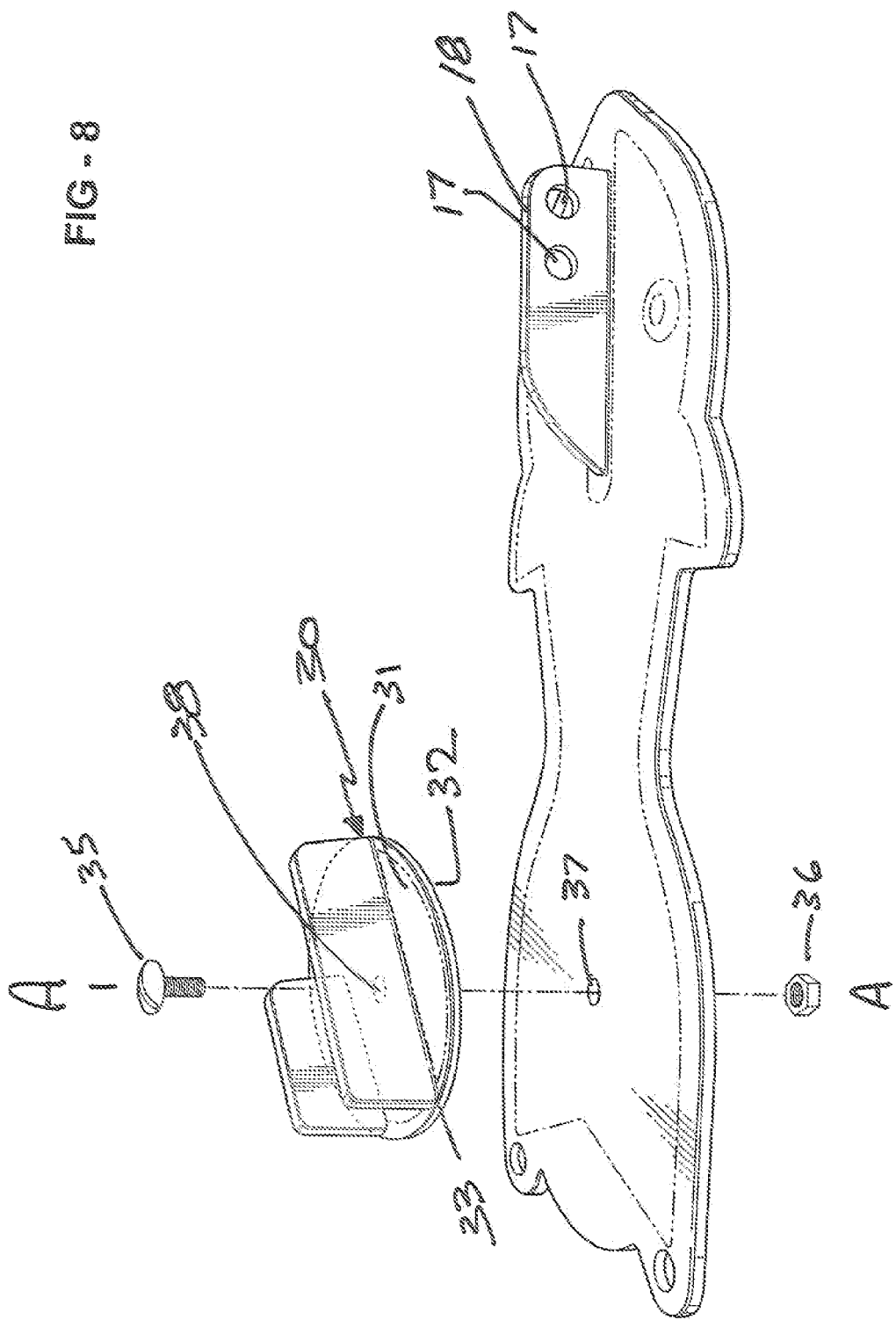

ADJUSTABLE TROLLING DEVICE

BACKGROUND OF THE INVENTION

The instant invention is directed to the field of fishing tackle and trolling tackle, generally, and dodgers, also called flashers, for trolling, specifically.

Trolling, particularly at depth below the surface of the water, and more particularly, at specified and adjustable depths, is a longstanding method of fishing, particularly sport fishing with artificial lures. A significant number of devices of the prior art exist, which are designed to be trolled, behind a trolling boat, at the end of a fishing line and which, by their shape, produce rotational or vibrational movement, in the water, as a "lure." These prior art devices, or lures, may have fishing hooks attached directly to them, or may be trolled, behind a boat, and prior to another hooked lure, or an array of lures, or other baits. Many of these devices are equipped with one or more splines, or "fins" which, depending upon their alignment with the directional pull of the device or lure, in the case of a dodger or flasher from which other fishing lures are trailed, will produce rotation of the primary device or lure which will, in turn, produce a rotation of abt trailing lure or lures. A number of these devices have one or more points of attachment at either end. For the most part, however, the devices of the prior art contain a fixed spline, or "fin" relationship to the device. This fixed relationship limits the ability to vary the degree of "flutter" or "rotation," or "roll," and to accomplish such a variation, a fisherman must vary the direction of the "pull" of the fishing line relative to the device and/or vary the directional trailing pull of the lures which trail the device. The present invention is directed to a trolling device or "dodger" which incorporates the general prior art utilization of a generally planar member, and one or more directional splines or fins, but, one in which, the fisherman, in using the same, may vary the rotation or roll of the device, and, thus, any lure or lures trailing it, without detaching or moving the lead trolling line, and without detaching or moving the trailing lure or lures. Examples of the prior art, which do not provide the benefit to an angler of the present device, are U.S. Pat. No. 4,320,592 to Kirsch, for a fishing device; U.S. Pat. No. 6,493,984 B1 to Bechhold, for a fishing lure and trolling flasher; U.S. Pat. No. 3,432,957 to S. Marino, for a fishing lure; U.S. Pat. No. 967,660, to T. Pedersen, for fishing tackle; and U.S. Pat. No. 2,758,408, to J. H. Murphy, et al, for fishing lures.

As may be readily ascertained from review of the prior art, prior devices, also referred to herein as "dodgers," "lures," and/or "flashers," are all designed to produce movement of the device itself, and/or trailing lures or devices, but none of the prior art provides the ability to definitively adjust the movement, roll, or rotation of the device in the water, without changing the general alignment of the device relative to the lead fishing or trolling line, and/or the trailing fishing lures, if applicable.

The present invention addresses a long standing need, as evidenced by current commercial success of the device, to provide a trolling device, commonly known as a "dodger" or "flasher" which may be affixed to a lead fishing line, and further affixed to one or more trailing lures and with regard to such a device, which an angler utilizing same may adjust the rotational movement, or roll, of the device quickly, easily, without additional equipment, and without removing or adjusting either the lead or trailing lines.

SUMMARY OF THE INVENTION

The present invention has been designed to overcome the shortcomings in the prior art as noted and referenced above. The present invention addresses a long felt need as further hereinafter described. As noted, existing trolling devices of the type commonly known as "dodgers," or "flashers," have, prior to the instant invention, failed to satisfy these requirements.

The instant invention is directed to the provision of a novel and unique trolling device, which, when attached to a lead trolling line, and further attached to one or more other trailing lures, may be easily adjustable to alter the rotational movement, or "roll," of the device, and correspondingly, the rotational movement or roll of any trailing lure or lures, by simple, manual adjustment of the angle at which one or more guiding splines or fins lies in relation to the directional pull of the trolling line connected to the device.

The instant invention provides an easy option of measurable, manual adjustment, without requiring additional tools, which will allow a fisherman to adjust a "dodger," or "flasher" to a predetermined rotational movement or roll, before commencing fishing, and, perhaps most importantly, during the course of a fishing excursion.

The invention described herein, primarily consists of a primary, generally planar member, which may be circular, triangular, polygonal, or even, in one demonstrated embodiment, in the general shape of a fish. The primary member has a forward edge and, further, around its perimeter has one or more eyelets for attaching the device to a trolling line, or, alternatively, to a swivel, clasp, or other connector, which is, in turn, attached to a trolling line. These eyelets may be formed holes in the perimeter of the primary member itself, or may be formed holes in a raised, guiding "fin," or "spline," on the forward portion or edge of the member, which spline is aligned, generally, in the direction of the pull of the towing line. In either event, the apertures provided may be one or more. The primary member, further, around or along its perimeter, and rearward of eyelet or eyelets for the trolling line has one or more apertures, to which a trailing line or lines may be attached, for attachment to one or more fishing lures. As with the eyelets for the lead or trolling line, swivels, clasps or other fasteners may be utilized to connect to the primary member, and, in turn, to connect to the trailing line or lines.

Rotatably attached to the primary member is a secondary member which contains one or more raised fins, or splines. The secondary member is attached to the primary member by a bolt, rivet, molded fastener, or other means, in a manner so that one side of the secondary member and the facing side of the primary member are proximate to each other, in parallel. The manner of affixation is such that the primary member is rotatable. In practice, the area of rotation may be of a limited number of degrees, or it may be fully rotatable through 360°. The fins or splines are slat-like members, affixed on one side, so that they are perpendicular and raised from the generally flat or planar surface of the secondary member, on the outer surface, not proximate to the primary member.

Both the primary member and secondary member have an outer edge which defines their shape. In practice, the primary member may be circular, oval, oblong, polygonal, or in the shape of a fish or other ornamental shape, so long as the general planar nature of the member is not deviated from significantly.

In practice, the secondary member is generally of a lesser exterior dimension than the primary member, although, for the invention to properly function, the only requirement is that the outer dimensions of the secondary member, when mounted on the primary member, be within and less than the exterior dimension of the primary member at the point of affixation of the lead or trolling line and the point of affixation of any trailing line or lines. The secondary member may be circular, but, subject to not interfering with the connecting eyelets or fasteners, may be of any shape, so long as it remains planar, and mounted parallel and flush to the primary member, and rotatable through either a fixed number of degrees, or 360°.

When the secondary member has an edge formed in the shape of a circle, an indentation in the primary member conforming to receive the secondary member, a male-female relationship about its exterior edge may be provided as well.

The guiding fin or spline on the secondary member may be singular, or may be mounted in a plurality. A third adjustable member may be provided, again having a planar front and back surface, with a raised spline on the outer surface and mounted sequentially, in parallel with both the secondary and primary member, and flush to the outward surface, or exterior, of the secondary member, partially rotatable about the same axis.

In any of the described embodiments, rotational positioning of the secondary member, and, where applicable, the adjustable member, at varying angles from the directional pull of the trolling line as attached to an eyelet in the forward portion of the primary member will produce a different characteristic of rotation or "roll" of the device and, correspondingly, of any trailing lure or lures. The instant device, thus, provides the distinct advantage over the existing prior art, allowing a fisherman to utilize one trolling device or dodger, adjustable to a variety of roll/rotational movement characteristics, as opposed to requiring a number of separate and different devices.

The primary member, and the corresponding other members, are described as being outwardly planar. However, textured or mottled exterior sides, or other slight deviation would not substantially depart from the spirit of the device.

The device may also be provided with different colors, and reflecting materials attached to all or a portion of the exterior surfaces of any of the members.

The above and additional features of the invention may be considered, and will become apparent in conjunction with the drawings, in particular, and the detailed description which follow.

BRIEF DESCRIPTION OF THE DRAWINGS

The following detailed description is best understood by reference to the following drawings:

FIG. 7 is a top prospective view of the device, with the primary member in the shape of a fish, with a pair of splines rotatably mounted on a second member, and showing a lead line attachment and trailing lure attachment.

FIG. 8 is an expanded view of the device in the shape of a fish.

DETAILED DESCRIPTION OF THE PREFERRED EMBODIMENT

Figure 1:
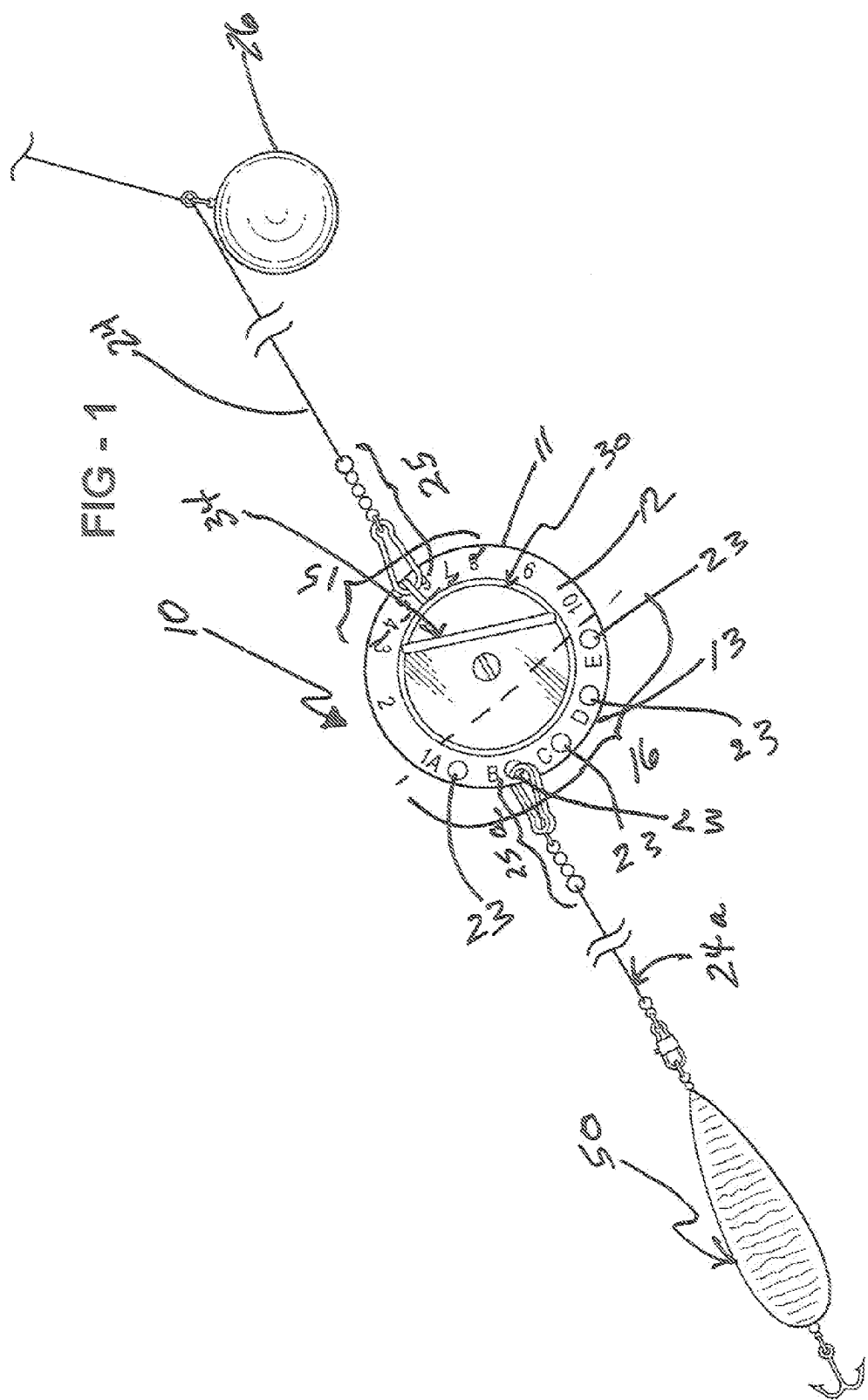
FIG. 1 is a prospective view of the invention, in use, attached to a lead trolling line, and a trailing fishing lure.

Throughout the following detailed description, like numerals to describe the same element of the present invention shown in multiple figures thereof.

The invention, adjustable trolling device, is a novel article of fishing tackle, utilized in trolling, particularly at depth, which in fishing device, commonly called a dodger or flasher, which, by its design, allows a fisherman using it to vary the rotational movement or roll of the device itself and the rotational movement or roll of any lures which are attached and trailing, it through the water.

Broadly considered, the device Adjustable Trolling Device 10 is comprised of a rigid primary member 11. Member 11 has front surface 12 and a back surface 13, both surfaces 12 and 13 being substantially planar. Member 11 further has an exterior edge 14, which defines the common surface dimension of both front surface 12 and back surface 13. The invention is not limited by the shape of primary member 11, as defined by edge 14, and may be circular, as shown in FIGS. 1 through 6, a fish profile or silhouette, as shown in FIGS. 7 and 8, triangular, oblong, oval, polygonal or other decorative embodiment.

Member 11 has a lead portion 15 and a trailing or rearward portion 16. An eyelet 17 is located near edge 14 on lead portion 15. In practice, eyelet 17 may be a hole or aperture in member 11 itself and defined by front surface 12 and back surface 13, or it may be a formed raised eyelet 17 as shown in FIGS. 1 through 8, where a raised fin or spline 18 is affixed to front surface 12 substantially perpendicular to front surface 12, and substantially bisecting lead portion 15 directionally from the first end 19, which corresponds with the lead portion 15, toward tail end 20, which corresponds with rearward portion 16.

Member 11 further a width dimension 21 defined by distance between opposite sides of edge 14, along the length 22 of member 11, length 22 being the distance between first end 19 and tail end 20.

Within the edge 14 of member 11 in the rearward portion 16 are one or more eyelets 23. A minimal one eyelet 23 is required, and the invention 10 is not limited by the number of additional eyelets 23 provided, as demonstrated by FIGS. 7 and 8 which show a pair of eyelets 23 and FIGS. 1 through 6, which show five eyelets 23. The purpose of said eyelets is to allow attachment of a trailing line or lines 24a for trailing lures 50 which may also be attached directly or indirectly through a clasp or swivel.

Figure 2:
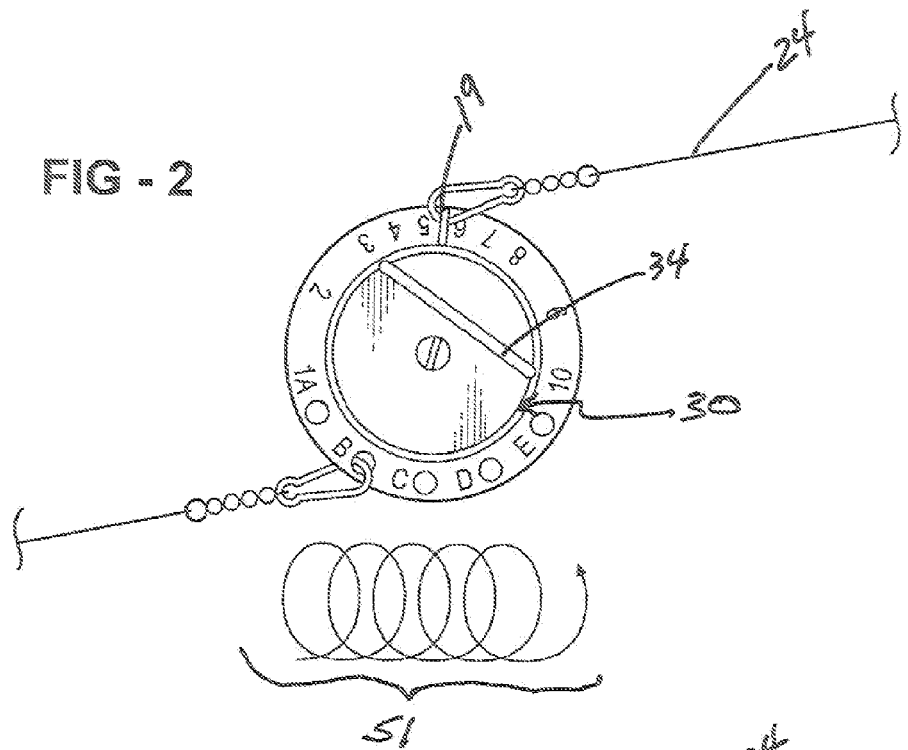
FIG. 2 is a top view of the device as attached to a lead towing line, and a trailing lure line, showing a projected relative rotational movement based upon the stated setting.
Figure 3:
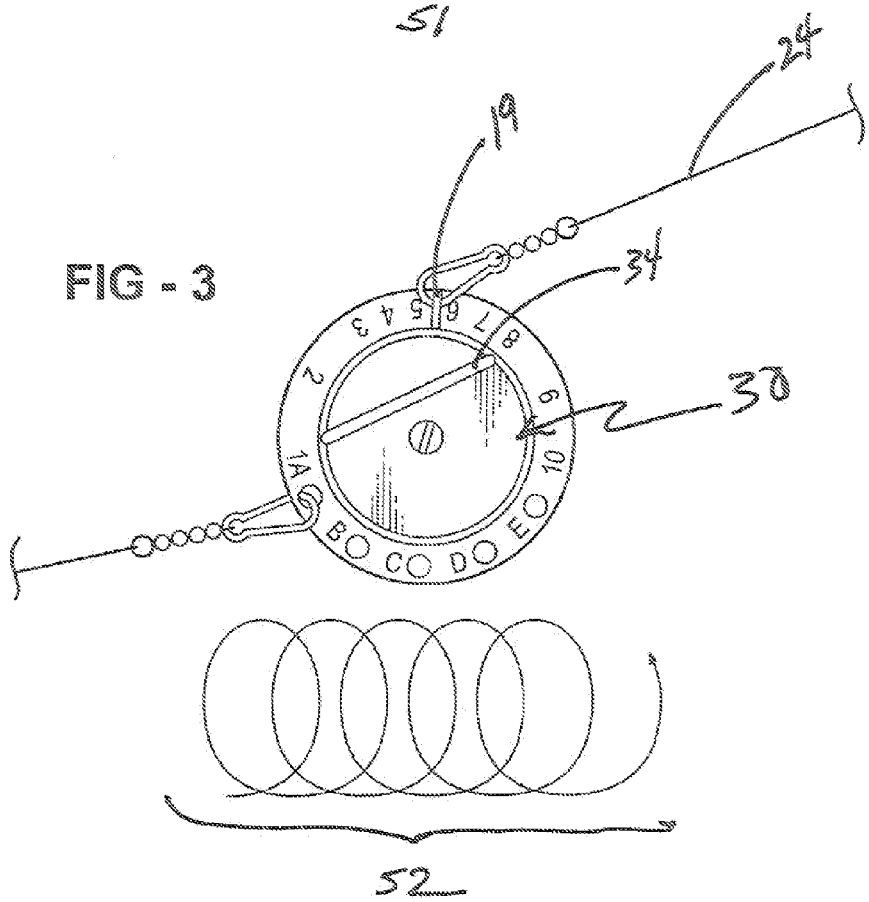
FIG. 3 is an additional top view of the device as attached to a lead towing line, and a trailing lure line, showing a projected relative rotational movement based upon the stated setting.

As shown in FIGS. 1 through 3, eyelet 17 on the lead portion 15 of member 11 is attached to fishing or trolling line 24, for trolling or towing the device 10. The connection to eyelet 17 may be direct, or indirectly through a clamp or swivel device 25. FIG. 1, also, though it is not a part of the invention 10, shows a downrigger weight or "cannonball" 26 used in trolling to bring the device 10 to a desired depth.

Rotatably affixed to primary member 11 is a rigid secondary member 30, having a substantially planar front surface 31 and a substantially planar back surface 32, with an exterior edge 33 defining the common exterior dimension of surfaces 31 and 32. The invention is not limited by the size or shape of the exterior dimension of secondary member 30, other than the limitation that the largest diameter D of member 33 must be sufficiently less than length dimension 22, that secondary member 30, when rotated through 360° will not contact or cover any of eyelets 23, eyelet 17 or spline 19.

Secondary member 30 has at least one raised spline member 34 affixed to front surface 31 substantially perpendicular to surface 31. FIGS. 1 through 3 demonstrate secondary member 30 with one spline member 34, while FIGS. 4 through 8 demonstrate a pair of raised spline members 34. As shown, spline members 34 are located off center of member 30, but so long as each spline member 34 is substantially perpendicular to surface 31, the invention 10 is not limited by any particular location of spline members 34, whether provided in singular or in a plurality.

Figure 6:
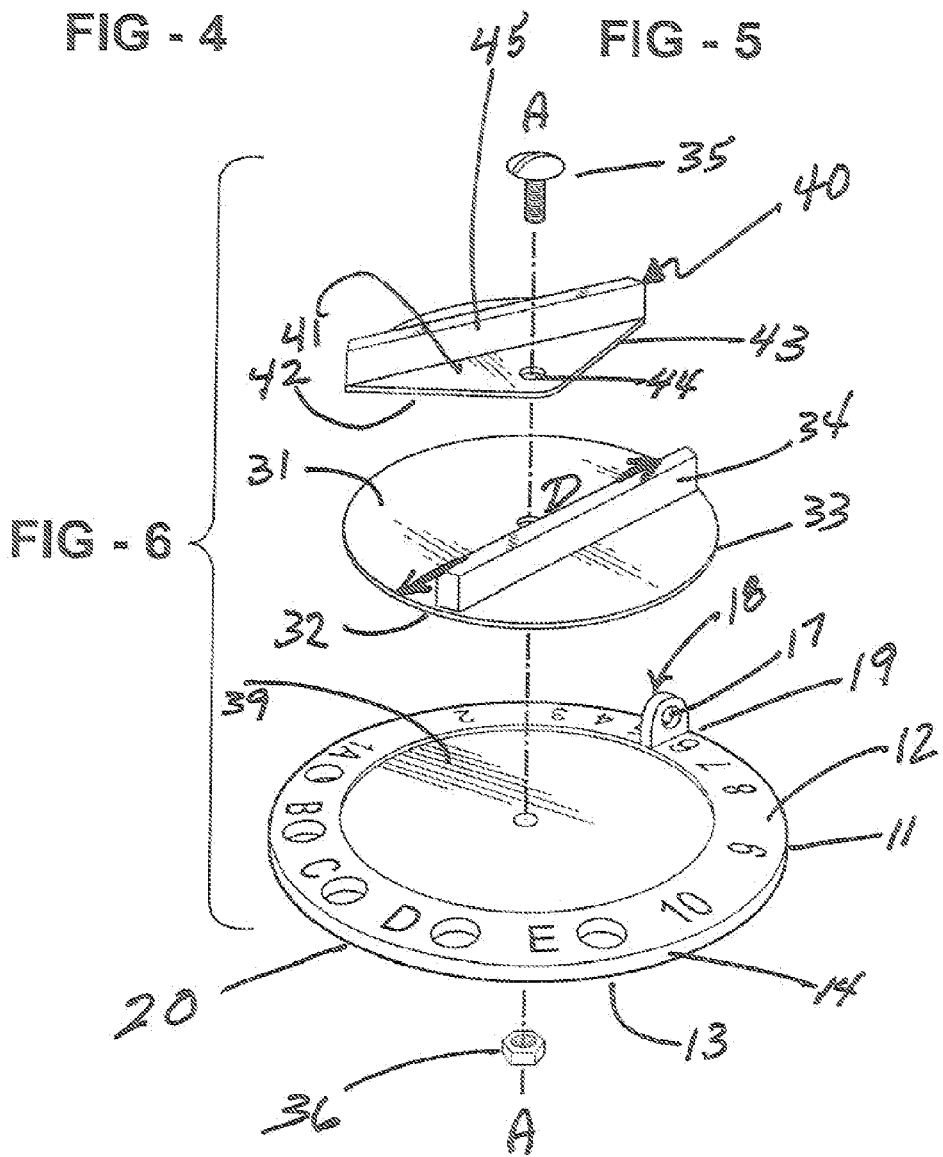
FIG. 6 is an expanded view of the device showing the base primary member, the rotatable secondary member, having a single spline, and an additional separately adjustable second guiding spline member.

Member 30 is rotatable about an Axis A-A, perpendicular to primary member front surface member 12 and secondary member front surface 31 as shown in FIGS. 6 and 8. Back surface 32 contacts and is proximate to front surface 12. As shown, member 30 is affixed to member 11 by a bolt 35 and nut 36, although alternative fasteners such as rivets, screws, molded plastic or the like may be used interchangeably.

Member 30 is rotatably mounted so that its rotation Axis A-A may be through a full 360° or may be fixed at any lesser range desired. Bolt 35 passes through aperture 37 defined by surfaces 12 and 13 and aperture 38 defined by surfaces 31 and 32.

In another preferred demonstrated feature of the invention 10, the front surface 12 of member 11 may define a circular indentation 39 shaped to conformably accept a circular member 30 in a male-female relationship, with member 30 rotatable within said indentation 39, as demonstrated in FIG. 6.

In a further modification and exemplification of the invention 10, a third rigid adjustable member 40 is provided, having a substantially planar front surface 41 and a substantially planar back surface 42 with an exterior edge 43 defining the common exterior dimension of both surfaces 41 and 42.

Figures 4, 5:
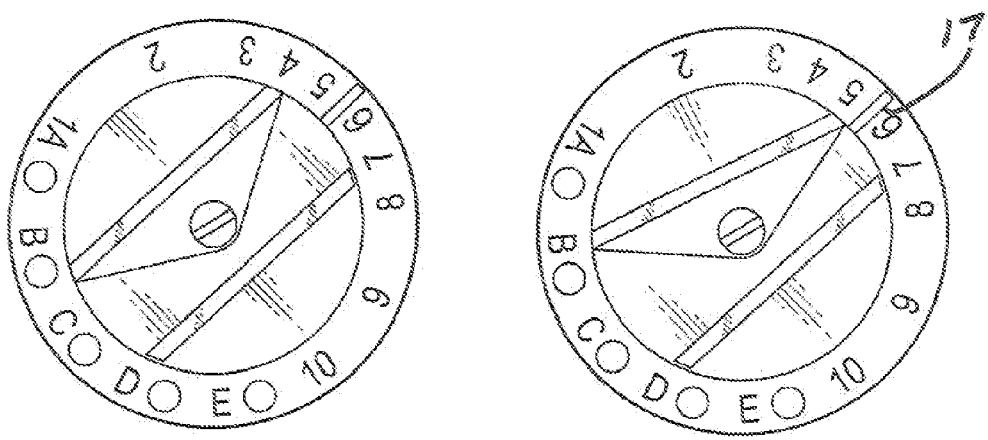
FIG. 4 is a top view of an embodiment of the invention showing a pair of guiding splines, mounted in parallel on the rotatable member.
FIG. 5 is a top view of the device showing a pair of guiding splines, mounted on the rotatable member, with the splines not aligned in parallel.

Member 40 is mounted rotatably about Axis A-A as shown in FIGS. 4 through 6, with back surface 42 proximate and contacting front surface 31. An aperture 44 is provided as defined by surfaces 41 and 42 to allow bolt 35 to pass through member 40 on Axis A-A. Member 40 has a raised spline 45 affixed substantially perpendicular to surface 41. Aperture 44 in member 40 is not centered and is placed proximate edge 43. As shown in FIGS. 4 through 6, member 40 may be rotated within a fixed range to provide that spline 45 may be parallel to spline 34 or at a variable angle thereto.

As a further feature of the invention, a portion of the surface 12 of member 11 and surfaces 31 and 32 of member 30 may be covered with reflective material or have a textured or mottled surface.

FIGS. 2 and 3, without being in limitation of available adjustments, demonstrate alternative adjustments of member 30 and spline 34 in relationship to forward point 19 and line 24, and differing roll characteristics 51 and 52.

It is the claims appended hereto, and all reasonable equivalents thereof, which define the true scope of the invention and the invention is not limited to the depicted embodiments and exemplifications.

What is claimed is:

1. An adjustable trolling device, comprising:
   a rigid primary member having a front substantially planar surface and a back substantially planar surface, and an exterior edge defining the dimension of both the front and back planar surfaces;
   said primary member having a lead portion and a rearward portion;
   a rigid secondary member having a substantially planar front surface and a substantially planar back surface, and an exterior edge defining the dimension of both the front and back planar surfaces;
   said secondary member having at least one raised spline affixed to its front surface extending outwardly and substantially perpendicular to said front surface;
   said secondary member rotatably affixed to said primary member, with the back surface of the secondary member parallel and adjacent to the front surface of the primary member, about an axis substantially perpendicular to the planar surface of the primary member so that each raised spline extends substantially perpendicular and outwardly from the front planar surface of the primary member; and;
   the primary member further having a towing-eyelet located outwardly and forward of the exterior edge of the secondary member and one or more eyelets located outwardly and rearward of the exterior edge of the secondary member.

2. The invention of claim 1, wherein the rigid secondary member has a circular exterior edge.

3. The invention of claim 2, wherein the rigid primary member on its front planar surface defines an indentation conformed to accept said rigid secondary member rotatably within it.

4. The invention of claim 1, wherein the secondary member has one spline.

5. The invention of claim 1, wherein the rigid secondary member has two splines.

6. The invention of claim 4, wherein the device further comprises:
   a third rigid adjustable member having a substantially planar front surface and a substantially planar back surface and an exterior edge defining the dimension of both surfaces;
   said third adjustable member being partially rotatable about the same axis as the secondary member independent of the rotation of said secondary member;
   said third adjustable member having a raised spline affixed to its front surface substantially perpendicular to said front surface.

7. The invention of claim 1, wherein:
   said rigid primary member has, a lead raised spline member affixed to its front surface substantially perpendicular to and extending outwardly from said front surface, proximate to and substantially bisecting the lead portion of the primary member.

8. The invention of claim 7, wherein said lead raised spline member additionally comprises one or more rowing eyelets, said eyelets being apertures defined by said lead spline member.

9. The invention of claim 1, wherein the rigid primary member has corresponding front and back planar surfaces substantially formed in a fish-shape silhouette.

10. The invention of claim 1, wherein a portion of the back planar surface of the primary member is covered with reflective material.

11. The invention of claim 1, wherein a portion of the front planar surface of the primary member is covered with reflective material.

12. An adjustable trolling device, comprising:
- a rigid primary member having a front substantially planar surface and a back substantially planar surface, and an exterior edge defining a first end and tail end and a width dimension of a fish silhouette for both the front and back planar surfaces;
- a rigid secondary member having a substantially planar front surface and a substantially planar back surface, and an exterior edge defining a circular dimension for both the front and back planar surfaces having a diameter less than the width dimension of the primary member;
- said secondary member having at least one raised spline affixed to its front surface and extending outwardly and substantially perpendicular to said front surface;
- said secondary member rotatably affixed to said primary member, with the back surface of the secondary member parallel and adjacent to the front surface of the primary member, about an axis substantially perpendicular to the planar surface of the primary member, so that each raised spline extends substantially perpendicular outwardly from the front planar surface of the primary member;
- the primary member further having a lead raised spline affixed to its front surface substantially perpendicular to said front surface, located outwardly and forward of the exterior edge of the secondary member, proximate to and bisecting first end of said primary member;
- said lead raised spline member further comprising one or more towing eyelets, said spline member defining apertures as such eyelets; and
- the tail end of said primary member located outwardly and rearward of the exterior edge of the secondary member and defining a plurality of apertures as trailing eyelets.

13. The invention of claim 12, wherein said secondary member has a pair of raised splines affixed thereon in parallel.

* * * * *